(12) United States Patent
Ono (10) Patent No.: US 7,177,615 B2
(45) Date of Patent: Feb. 13, 2007

(54) RECEIVER WITH ADJACENT INTERFERING WAVE ELIMINATION FUNCTION

(75) Inventor: Yasushi Ono, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 795 days.

(21) Appl. No.: 10/455,477

(22) Filed: Jun. 6, 2003

(65) Prior Publication Data

US 2004/0213366 A1   Oct. 28, 2004

(30) Foreign Application Priority Data

Jul. 2, 2002   (JP)   ............................. 2002-193222

(51) Int. Cl.
*H04B 1/10* (2006.01)
*H04B 1/16* (2006.01)
(52) U.S. Cl. ........................ 455/296; 455/334; 375/348
(58) Field of Classification Search ................ 455/296, 455/305, 306, 307, 226.1, 266, 226.3, 263, 455/295, 135, 130, 334, 73; 375/348, 350
See application file for complete search history.

(56) References Cited

U.S. PATENT DOCUMENTS

| 4,249,261 A * | 2/1981 | Ogita ........................ 455/266 |
| 5,307,515 A | 4/1994 | Kuo et al. |
| 5,493,717 A | 2/1996 | Schwarz |
| 6,058,148 A * | 5/2000 | Whikehart et al. ......... 455/296 |
| 6,181,750 B1 | 1/2001 | Guillemain et al. |
| 6,314,144 B1 | 11/2001 | Moriyama et al. |
| 7,039,093 B2 * | 5/2006 | Rouphael et al. ........... 455/307 |
| 2002/0021687 A1 | 2/2002 | Toki et al. |
| 2002/0065060 A1 * | 5/2002 | Minnis et al. ............... 455/307 |

FOREIGN PATENT DOCUMENTS

| DE | 42 44 630 | 7/1993 |
| EP | 0 887 944 | 12/1998 |
| JP | 63-194423 | 8/1988 |
| JP | 2000-013262 | 1/2000 |
| JP | 2001-103106 | 4/2001 |
| JP | 2001-326576 | 11/2001 |

* cited by examiner

*Primary Examiner*—Aung Moe
(74) *Attorney, Agent, or Firm*—Drinker Biddle & Reath LLP (57) ABSTRACT

A receiver with adjacent interfering wave elimination function that efficiently eliminates an interfering wave adjacent to a desired reception wave and has few distortion in the receiving signal after detection, is provided with a plurality of bandpass filters for detecting an adjacent interfering wave near a desired reception wave, detects adjacent interfering waves near the desired reception wave, and controls the bandwidths of the bandpass filters that pass the desired reception wave according to the occurrence of the adjacent interfering wave. According to another aspect of the present invention, the bandpass filter for detecting the adjacent interfering wave is made of a digital filter whose center frequency is variable, and the adjacent interfering wave is detected by scanning a frequency region adjacent to the desired reception wave with the digital filter.

23 Claims, 7 Drawing Sheets

RECEIVER WITH ADJACENT INTERFERING WAVE ELIMINATION FUNCTION

BACKGROUND OF THE INVENTION

1. Field of the Invention

The present invention relates to receivers and the like having the function of detecting and eliminating an interfering wave adjacent to the desired reception wave.

2. Description of the Related Art

Figure 1:
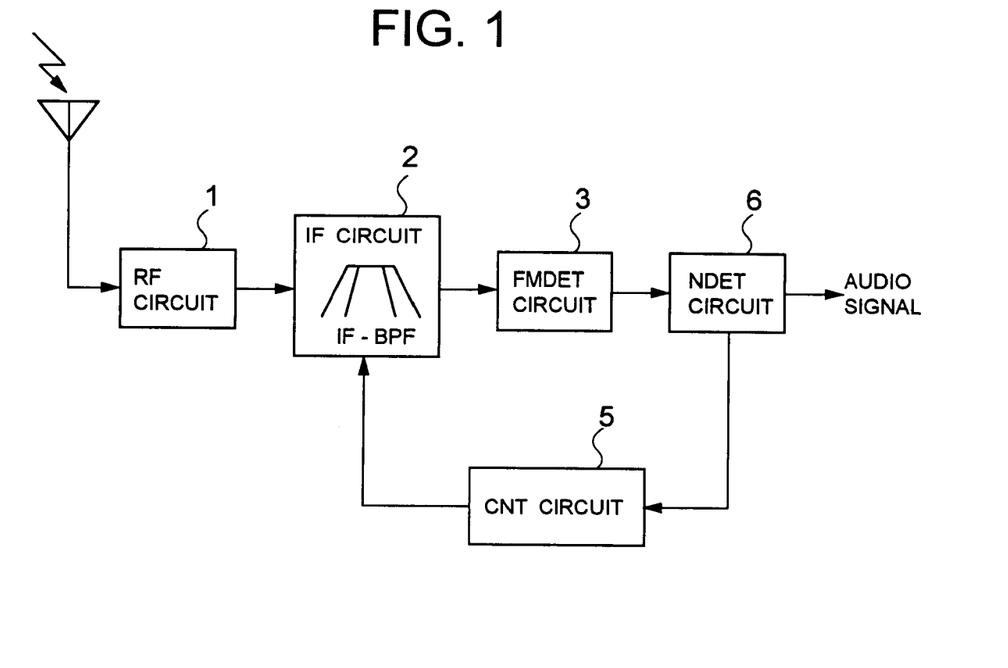
FIG. 1 is a block diagram showing the configuration of a conventional receiver having the function of eliminating an adjacent interfering wave.

In conventional FM broadcasting receivers and the like, the function of detecting and eliminating an adjacent interfering wave near a desired broadcast wave is achieved by the configuration of a receiver as shown in FIG. 1.

In FIG. 1, a received electromagnetic wave from an antenna is subjected to processing such as tuning and high-frequency amplification in a high-frequency processing circuit 1, and then supplied to an intermediate-frequency processing circuit 2. The intermediate-frequency processing circuit 2 first converts the frequency of a high-frequency signal that has been selected through tuning in the high-frequency processing circuit 1 into a predetermined intermediate-frequency. Then, the intermediate-frequency processing circuit 2 passes the intermediate-frequency signal through a bandpass filter having a predetermined pass bandwidth, eliminates interfering waves adjacent to the desired reception wave, and outputs the signal to a detection circuit 3 in the following stage. The detection circuit 3 detects an output signal from the intermediate-frequency processing circuit 2 by using an FM detector such as ratio detector, a quadrature detector, or a Foster-Seeley discriminator for example, and extracts an audio signal that is superimposed on the output signal.

On the other hand, a high-frequency noise detection circuit 6 passes the output signal from the detection circuit 3 through, for example, a high-pass filter having a predetermined cut-off frequency and detects high-frequency noise components contained in the audio signal of the detection output. The high-frequency noise components can be regarded as the result of signal components of interfering waves adjacent to the desired reception wave manifesting themselves in the detected output. Therefore, a control circuit 5 decides the presence of adjacent interfering waves from the detection result and controls the pass bandwidth of a bandpass filter (hereinafter, referred to as simply "IF-BPF") built into the intermediate-frequency processing circuit 2.

That is to say, the wider the pass bandwidth of the IF-BPF is, the higher the sound quality of the audio signal that is superimposed on the desired reception wave through frequency modulation is, because sideband wave groups of the desired reception wave can be picked up broadly. But at the same time, there is the risk that many interfering waves adjacent to the desired reception wave are picked up. On the other hand, if the pass bandwidth of the IF-BPF is narrowed, adjacent interfering waves can be eliminated, however many of the sideband wave groups of the desired reception wave are eliminated at the same time.

Figure 2:
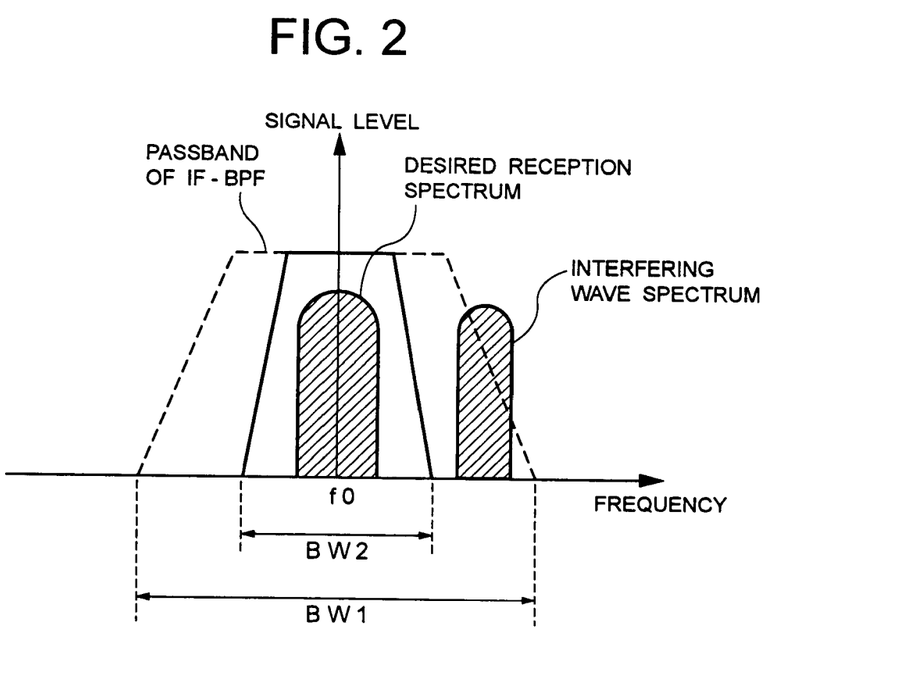
FIG. 2 is a diagram illustrating how the bandwidth of the IF-BPF in the receiver of FIG. 1 is controlled.

The control circuit 5 therefore examines the size of the high-frequency noise components that have been detected by the high-frequency noise detection circuit 6, and when this noise level exceeds a predetermined value, it performs a control for narrowing the pass bandwidth of the IF-BPF from BW1 to BW2, for example, as shown in FIG. 2. In FIG. 2, the horizontal axis represents the frequency, and the vertical axis represents the signal level of the frequency spectrum.

In the conventional method, however, the frequency range in which there are adjacent interfering waves near the desired reception wave cannot be decided because the signal components of the adjacent interfering waves are deduced from the high-frequency noise contained in the output signal after detection. In addition, when multi-path noise occurs from a temporary change in the conditions for electromagnetic wave propagation, or when there is noise due to over-modulation distortion, then the signal components produced by that noise are also interpreted as adjacent interfering waves. Therefore, it has been difficult to effectively eliminate adjacent interfering waves by optimally controlling the pass bandwidth of the IF-BPF with conventional methods.

Therefore, the above problem is an example of the problems to be solved by the present invention. An object of the present invention is to provide a receiver with adjacent interfering wave eliminating function that allows to efficiently eliminate adjacent interfering waves without loss of sound quality of a receiving signal.

SUMMARY OF THE INVENTION

In accordance with the present invention, a receiver with adjacent interfering wave elimination function for detecting and eliminating an adjacent interfering wave that is adjacent to a receiving signal frequency, includes:

a high-frequency processing device that selects a desired high-frequency signal from received high-frequency signals and amplifies it;

an intermediate-frequency processing device that converts a frequency of the selected high-frequency signal to generate an intermediate-frequency signal, and outputs components within a predetermined passband of the intermediate-frequency signal;

an adjacent interfering wave detector that detects an interfering wave contained in a region adjacent to a frequency band of the selected high-frequency signal and generates an adjacent interfering wave detection signal indicating a frequency range in which the interfering wave exists; and a control device for adjusting the passband so as to eliminate the frequency range in which the adjacent interfering wave exists from the passband based on the adjacent interfering wave detection signal.

DETAILED DESCRIPTION OF THE INVENTION

Figure 3:
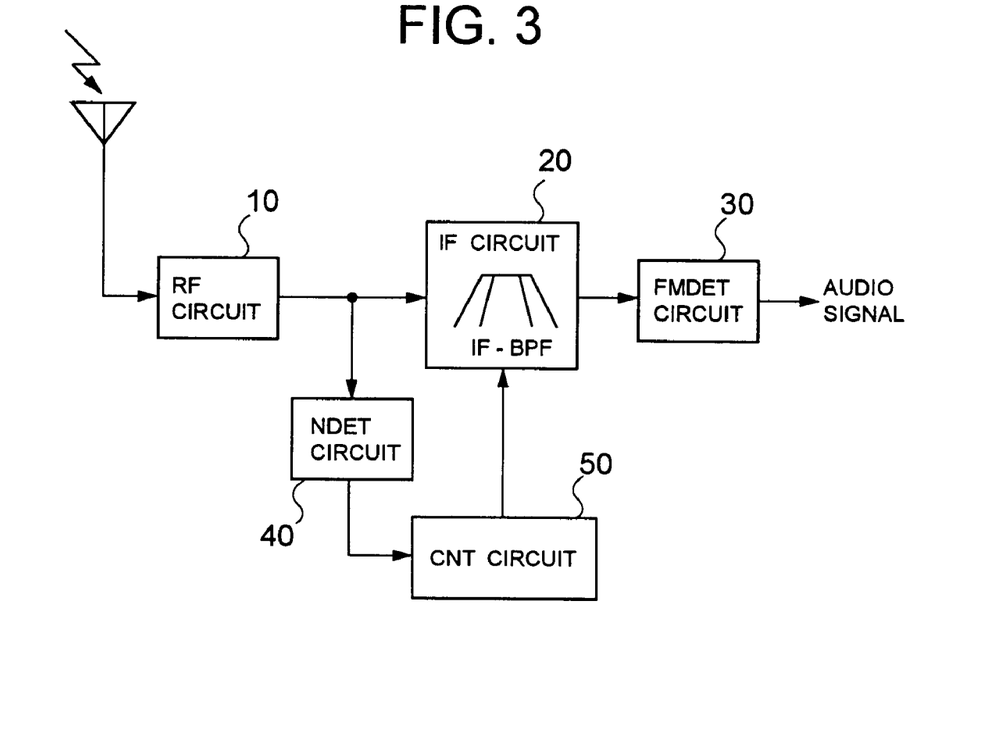
FIG. 3 is a block diagram showing the configuration of a receiver having the function of eliminating an adjacent interfering wave according to a first and a second embodiments of the present invention.

FIG. 3 is a block diagram showing a first embodiment of a receiver with adjacent interfering wave elimination function according to the present invention.

In FIG. 3, a high-frequency processing circuit 10 performs such high-frequency signal processes as a tuning process for selecting a desired broadcast wave from electromagnetic waves that have been received with an antenna, and an amplifying process for amplifying the selected high-frequency signal to a predetermined level.

An intermediate-frequency processing circuit 20 converts the frequency of the high-frequency signal selected by the high-frequency processing circuit 10 into a predetermined intermediate frequency and amplifies it. In addition, the intermediate-frequency processing circuit 20 is provided with an IF-BPF having a predetermined pass bandwidth, and an intermediate-frequency signal is output to a detection circuit 30 through the IF-BPF. The pass bandwidth of the IF-BPF can be adjusted freely according to an instruction from a control circuit 50 described later. Furthermore, the IF-BPF may be made of one filter circuit, or a plurality of filter circuits with different pass bandwidth and Q in cascade connection.

The detection circuit 30 detects an output signal from the intermediate-frequency processing circuit 20 using an FM detector such as a ratio detector, quadrature detector, or a Foster-Seeley discriminator, for example.

An adjacent interfering wave detection circuit 40 directly detects adjacent interfering waves by providing a plurality of bandpass filters having a different center frequency of a passband within a predetermined frequency region having its center at the frequency of the desired reception wave that has been selected by tuning with the high-frequency processing circuit 10. The detection result from the adjacent interfering wave detection circuit 40 is notified to the control circuit 50.

Figure 4:
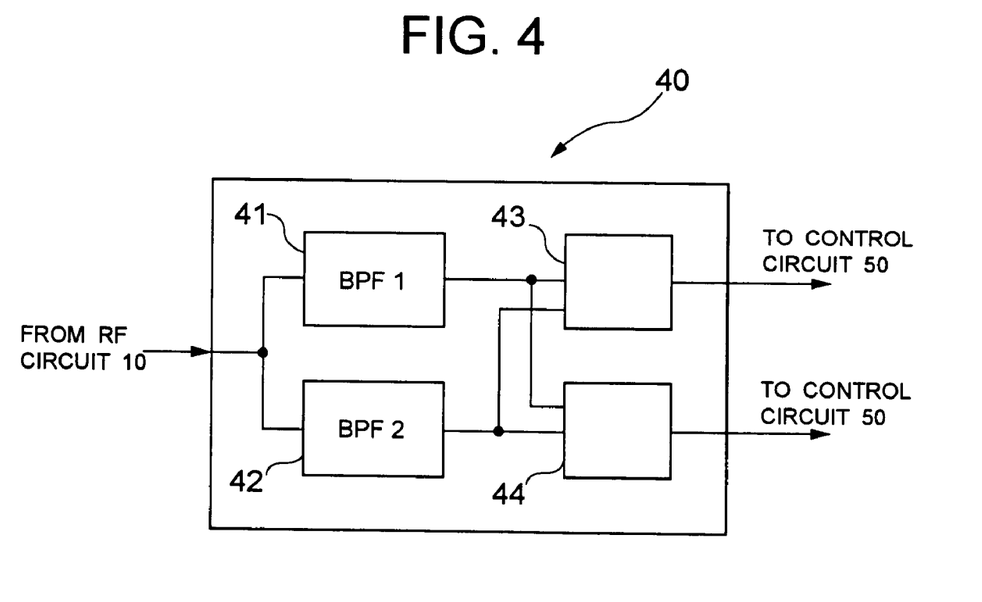
FIG. 4 is a diagram showing an example of an adjacent interfering wave detection circuit 40.

FIG. 4 shows an example of the adjacent interfering wave detection circuit 40, which includes a first filter (BPF1) 41 and a second filter (BPF2) 42 that receive a high-frequency signal from the high-frequency processing circuit 10, a discrimination circuit 43, and a signal level detection circuit 44. Output signals from the first filter 41 and the second filter 42 are supplied to the discrimination circuit 43 and the signal level detection circuit 44. The center frequencies of the first filter 41 and the second filter 42 will be described later with reference to FIG. 5.

The discrimination circuit 43 compares the amplitudes of the high-frequency output signals from the first filter 41 and the second filter 42, generates a filter discrimination signal that represents the filter with the greater amplitude, and sends it out to the control circuit 50. The signal level detection circuit 44 detects the amplitudes of the high-frequency signals that have passed through the first filter 41 and the second filter 42, generates an amplitude level of the high-frequency signal with the greater amplitude as a level detection signal representing the level detection result, and sends it out to the control circuit 50. It is also possible that the adjacent interfering wave detection circuit 40 supplies the filter discrimination signal and the level detection signal to the control circuit 50 as signals multiplexed by a method such as a time-division multiplexing or a frequency multiplexing, instead of supplying them independently to the control circuit 50.

The control circuit 50 is made of a microcomputer, a memory circuit, and their peripheral circuits, and controls the entire operation of the receiver shown in FIG. 3.

Hereinafter, the operation according to the embodiment shown in FIG. 3 will be described.

The desired broadcast wave among the electromagnetic waves received with the antenna is first subjected to various kinds of processing by the high-frequency processing circuit 10, the intermediate-frequency processing circuit 20, and the detection circuit 30, and an audio signal that is superimposed on the broadcast wave through frequency modulation is reproduced.

On the other hand, the output signal from the high-frequency processing circuit 10 is also output to the adjacent interfering wave detection circuit 40, in parallel to the above processing, and supplied to a plurality of bandpass filters that constitute the adjacent interfering wave detection circuit 40.

For frequency-modulated broadcast waves, the spacing between broadcast channels is generally 100 kHz. That is because when the maximum frequency deviation during frequency modulation is 75 kHz and the highest frequency of the audio signal, which is the modulation signal, is 15 kHz, the sideband wave groups containing most of modulation energy fall substantially within the band of ±90 kHz of the carrier frequency. Therefore, with this broadcast channel arrangement, the interfering wave that is closest to the desired reception wave, that is, the broadcasting wave of another channel is located within ±100 kHz of the desired reception wave f0.

Figure 5:
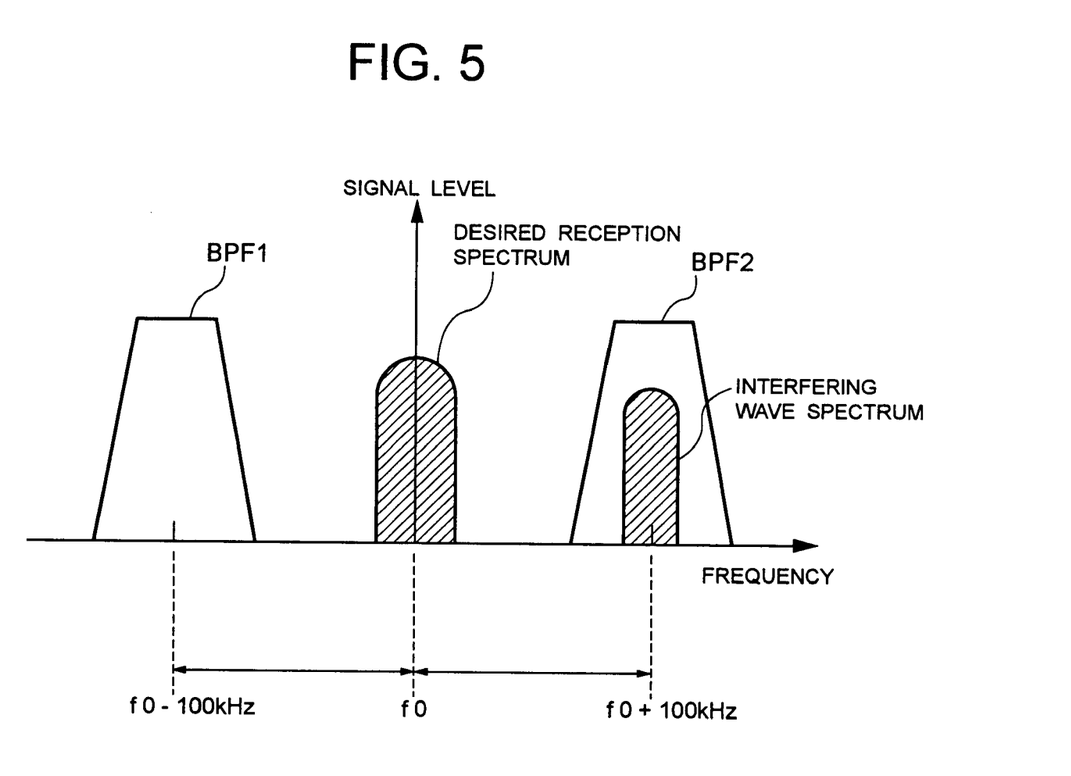
FIG. 5 is a diagram showing the disposition of an adjacent interfering wave detection filter according to the first embodiment of the present invention.

Therefore, the adjacent interfering wave detection circuit 40 of the present embodiment is provided with two passband filters BPF1 and BPF2 whose center frequencies of the passband are at positions of ±100 kHz from the desired reception wave f0 that has been selected by the high-frequency processing circuit 10, as shown in FIG. 5. It should be noted that there are no particular limitations to the number of bandpass filters that constitute the adjacent interfering wave detection circuit 40, their characteristics, and their arrangement in the frequency domain, and various modifications may be employed, depending on conditions such as receiver specifications and the usage environment.

The example in FIG. 5 shows a case in which an adjacent interfering wave is generated on the high frequency side of the desired reception wave f0. In this case, the adjacent interfering wave can be detected by the BPF 2, whose passband is in the relevant frequency region. When the adjacent interfering wave detection circuit 40 detects an adjacent interfering wave with the BPF 2, information such as the detection of the adjacent interfering wave and its signal level is notified to the control circuit 50.

The control circuit 50 controls the pass bandwidth of the IF-BPF in the intermediate-frequency processing circuit 20 based on this information. For example, when there is only an adjacent interfering wave on the high frequency side of the desired reception wave as shown in FIG. 5, the control circuit 50 narrows the passband of the IF-BPF only on the high frequency side, changing the pass bandwidth from BW1 to BW3. In the example shown in FIG. 6, the low frequency side of the passband after band-narrowing is almost equal to that before band-narrowing. Therefore, compared with the conventional example shown in FIG. 2, the pass bandwidth is:

BW2<BW3

Figure 6:
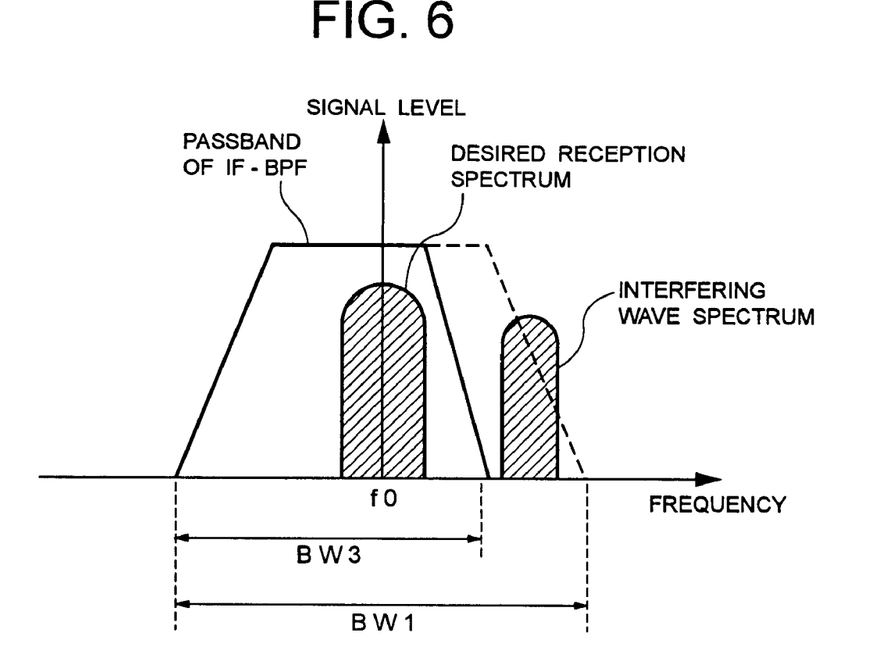
FIG. 6 is a diagram illustrating how the bandwidth of the IF-BPF according to the first embodiment of the present invention is controlled.

Thus, the IF-BPF has a wider passband than that after the band-narrowing process according to the conventional example. That is to say, the IF-BPF can pick up more sideband groups regarding the desired reception wave than in the conventional case. Thus, a decrease in quality of the audio signal after the desired reception wave is demodulated and detected can be prevented.

Figure 7:
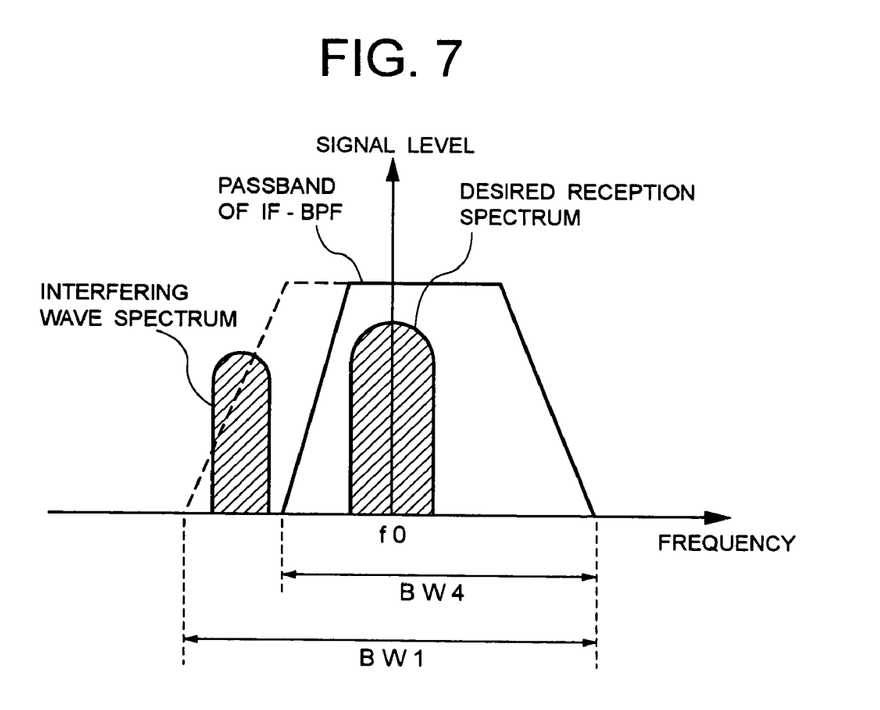
FIG. 7 is a diagram illustrating another way of controlling the bandwidth of the IF-BPF according to the first embodiment of the present invention.

FIG. 7 illustrates the processing when an adjacent interfering wave is generated on the low frequency side of the desired reception wave f0. As in the above case, compared with the pass bandwidth BW2 after the band-narrowing process according to the conventional example, the pass bandwidth BW4 of the IF-BPF after band-narrowing is:

BW2<BW4

That is to say, in the present embodiment, a band-narrowing control of the pass bandwidth of the IF-BPF is performed by recognizing whether an adjacent interfering wave exists on the high frequency side or on the low frequency side of the desired reception wave, so that it is possible to efficiently eliminate only the adjacent interfering wave without unnecessarily reducing the sideband groups of the desired reception wave.

The method for eliminating the adjacent interfering wave from the pass bandwidth of the IF-BPF is not limited to the above band-narrowing control. For example, a control for eliminating adjacent interfering waves from the pass bandwidth of the IF-BPF may also be performed by recognizing whether an adjacent interfering wave exists on the high frequency side or on the low frequency side of the desired reception wave and displacing the center frequency of the pass bandwidth of the IF-BPF in the direction opposite to the adjacent interfering wave.

In addition, according to the present embodiment, a frequency component of the adjacent interfering wave is extracted directly from the output signal from the high-frequency processing circuit 10. Therefore, there is no risk that noise components due to cross modulation distortion that is generated by a non-linearity of, for example, the intermediate-frequency processing circuit 20 are erroneously detected as components of an adjacent interfering wave.

Next, a second embodiment of a receiver with adjacent interfering wave elimination function according to the present invention will be described. The configuration blocks of the receiver according to the second embodiment are the same as in the first embodiment described above. Therefore, the block diagram of the first embodiment shown in FIG. 3 is used for the following explanation of the overall configuration of the receiver.

The present embodiment is characterized in that a center frequency variable bandpass filter whose passband center frequency can be freely adjusted is used as a bandpass filter for detecting adjacent interfering waves that constitutes the adjacent interfering wave detection circuit 40. That is to say, the center frequency variable bandpass filter sequentially scans a predetermined frequency region containing the desired reception wave, so that the frequency range in which the adjacent interfering wave exists near the desired reception wave can be accurately monitored, which is the point of the present embodiment.

Hereinafter, the operation according to the second embodiment will be described.

As in the case of the first embodiment, a desired broadcast wave from the electromagnetic waves received with the antenna is subjected to various kinds of processing by the high-frequency processing circuit 10, intermediate-frequency processing circuit 20, and detection circuit 30, and then an audio signal that is superimposed on the broadcast wave through frequency modulation is reproduced.

On the other hand, the output signal from the high-frequency processing circuit 10 is also supplied to the adjacent interfering wave detection circuit 40, in parallel to the above processing. As described above, in the bandpass filters for detecting adjacent interfering waves that constitutes the adjacent interfering wave detection circuit 40, the center frequency of the passband can be freely adjusted according to instructions from the control circuit 50.

Figure 8:
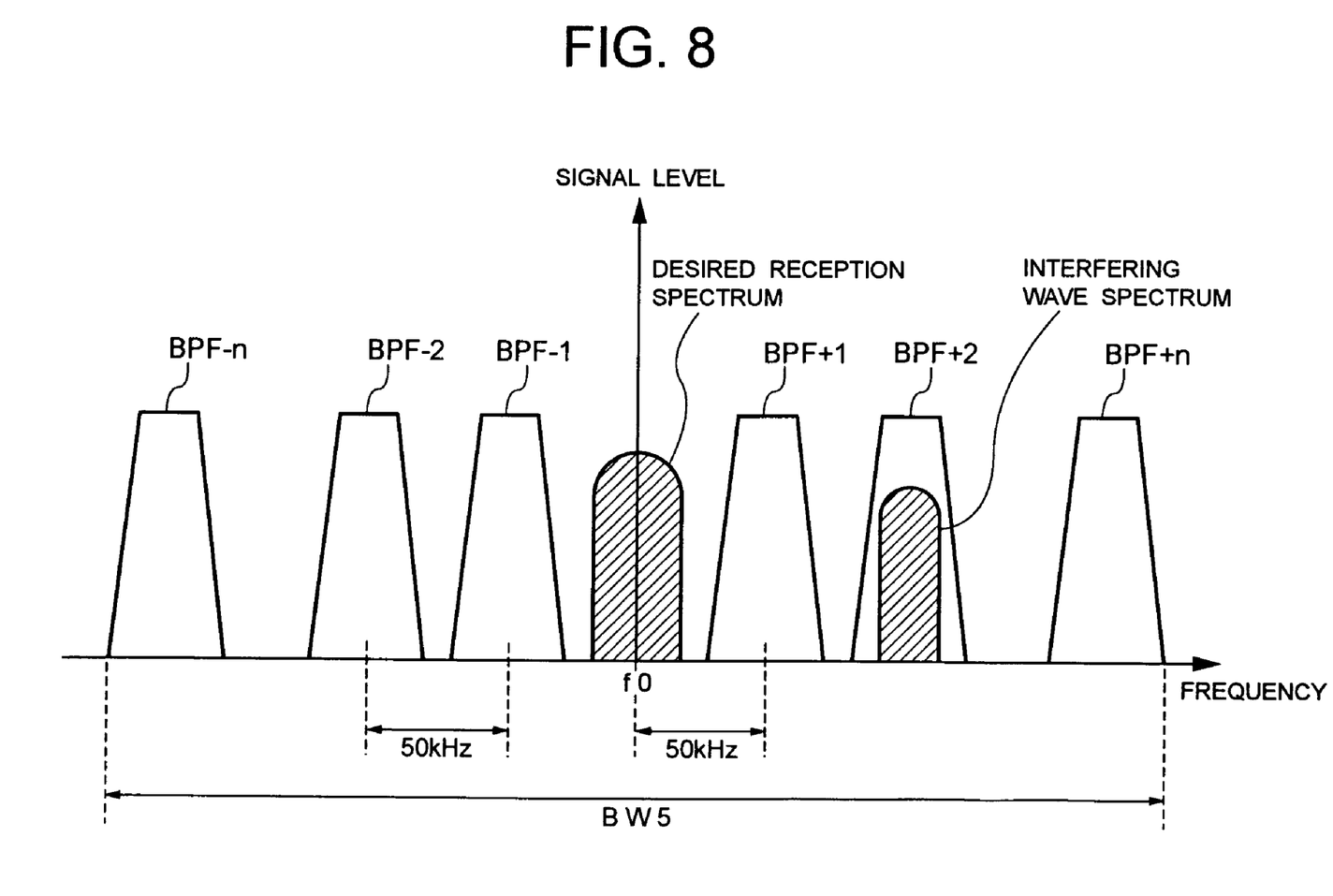
FIG. 8 is a diagram illustrating how a frequency region is scanned by the adjacent interfering wave detection filter according to the second embodiment of the present invention.

In the present embodiment, as shown in FIG. 8, a predetermined frequency region BW5 containing the desired reception wave f0 is sequentially scanned using the center frequency variable bandpass filter whose center frequency of the passband can be adjusted in 50 kHz steps. For example, if the frequency region BW5 is scanned at the timing of 1 step/ms, then the scanning of the frequency region BW5 requires (BW5/50 kHz)×1 ms.

It should be noted that the step frequency and the scanning unit time are not limited to this example and various values can be taken according to the actual usage environment and usage conditions of the receiver. In addition, the scanning of the frequency region BW5 may be performed from the highest frequency side (BPF+n) or from the lowest pass side (BPF−n). Also, the scanning may be performed according to a predetermined scanning sequence as shown below.

(BPF+1)→(BPF−1)→(BPF+2)→(BPF−2)→ . . .

The adjacent interfering wave detection circuit 40 can precisely detect information such as a frequency range containing an adjacent interfering wave near the desired reception wave and its signal level by performing one cycle of the scanning process. The adjacent interfering wave detection circuit 40 notifies the control circuit 50 of the information, and the control circuit 50 correctly controls the passband of the IF-BPF built into the intermediate-frequency processing circuit 20 based on this information. The method of controlling is the same as in the first embodiment mentioned above.

However, in the present embodiment, the presence of adjacent interfering waves near the desired reception wave can be monitored in greater detail than in the first embodiment. Therefore, when the passband of the IF-BPF is subjected to band-narrowing, for example, several stages of band-narrowing may be performed according to the frequency range containing the adjacent interfering wave. Also, by using the frequency range in which a plurality of adjacent interfering waves exist and their signal levels as parameters, the range in which the passband of the IF-BPF is subjected to band-narrowing may be decided as a function of those parameters. By providing such a function, an optimum IF-BPF that minimizes the effect of adjacent interfering waves and also minimizes distortion after modulation and detection can be constituted.

In addition, according to the present embodiment, the center frequency of the bandpass filter for detecting adjacent interfering waves can be set freely, so that the receiver is adaptable even to regions such as Europe in which adjacent broadcast channels are located at intervals of ±50 kHz, for example.

Hereinafter, the concrete configuration of the adjacent interfering wave detection circuit 40 according to a second embodiment will be described.

Figure 9:
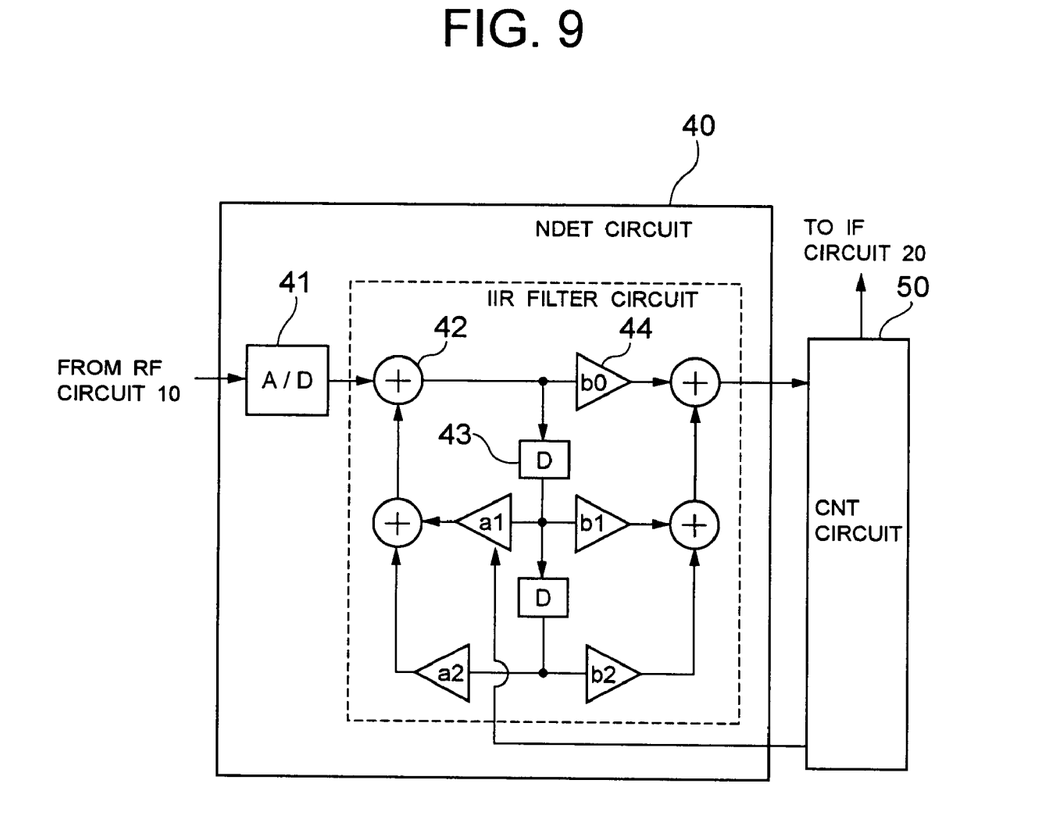
FIG. 9 is a block diagram showing the configuration of the adjacent interfering wave detection circuit 40 according to the second embodiment of the present invention.

FIG. 9 shows an embodiment in which the center frequency variable bandpass filter, which is a main component of the adjacent interfering wave detection circuit 40, is made of IIR (Infinite Impulse Response) type digital filter.

In FIG. 9, an analog/digital conversion circuit (hereinafter, referred to as simply "A/D conversion circuit") 41 converts, with a predetermined sampling frequency and quantization level, an analog signal, which is output from the high-frequency processing circuit 10, into a digital signal having a predetermined sampling rate and bit length.

The analog/digital conversion circuit 41 includes adding circuits 42, delay circuits 43, and coefficient circuits 44 are components, which are used for general digital filters. That is to say, the adding circuits 42 add two digital signals that are applied to them, and the delay circuits 43 delay the digital signal that is applied to them by one sampling time. The coefficient circuits 44 multiply the digital signal that is applied to them by the setting coefficient of the circuits a1, a2, b0, b1, and b2. The transfer function H(z) of the IIR digital filter having the configuration shown in FIG. 9 can be expressed by:

$$H(z)=(b0+b1 \cdot z^{-1}+b2 \cdot z^{-2})/(1+a1 \cdot z^{-1}+a2 \cdot z^{-2})$$

Desired filter characteristics can be achieved by selecting appropriate coefficients for the transfer function.

When a band pass filter is made of the IIR digital filter shown in FIG. 9, the coefficient b1 of the transfer function becomes 0 and the coefficient that determines the center frequency of the passband becomes a1. Therefore, various bandpass filters with different center frequencies can be sequentially constituted in chronological order by sequentially altering the value of a1. In the present embodiment, the control circuit 50 alters the value of a1 once per ms, varies the center frequency of the IIR digital band filter in 50 kHz steps, and a bandpass filter that covers the whole area of BW5 shown in FIG. 9 can be sequentially achieved.

While the control circuit 50 scans the frequency region BW5, it picks up signal levels in passbands from (BPN−n) to (BPN+n) as digital values from the IIR digital filter, and monitors the occurrence of adjacent interfering waves in BW5. Furthermore, it sends out control instructions for appropriately controlling the pass bandwidth of the IF-BPF to the intermediate-frequency processing circuit 20 in response to adjacent interfering waves.

As described above, the present embodiment allows to detect routinely how far away in terms of frequency from the desired reception wave there is an interfering wave and what level it has, so that an optimum IF-BPF can be always constituted in the intermediate-frequency processing circuit 20. Additionally, the circuit scale (the number of gates) of the digital filter can be reduced because only one coefficient of the transfer function that constitutes the digital filter is changed in the scanning process of the filter.

It should be noted that the IIR digital filter of the adjacent interfering wave detection circuit 40 is not limited to the configuration shown in FIG. 9, and various other configurations can be employed. Also, the type of the digital filter is not limited to the IIR type, and, for example, a FIR (Finite Impulse Response) type digital filter may be used as well. Furthermore, as the center frequency variable bandpass filter of the adjacent interfering wave detection circuit 40, an analog active filter may be used instead of a digital filter.

Figure 10:
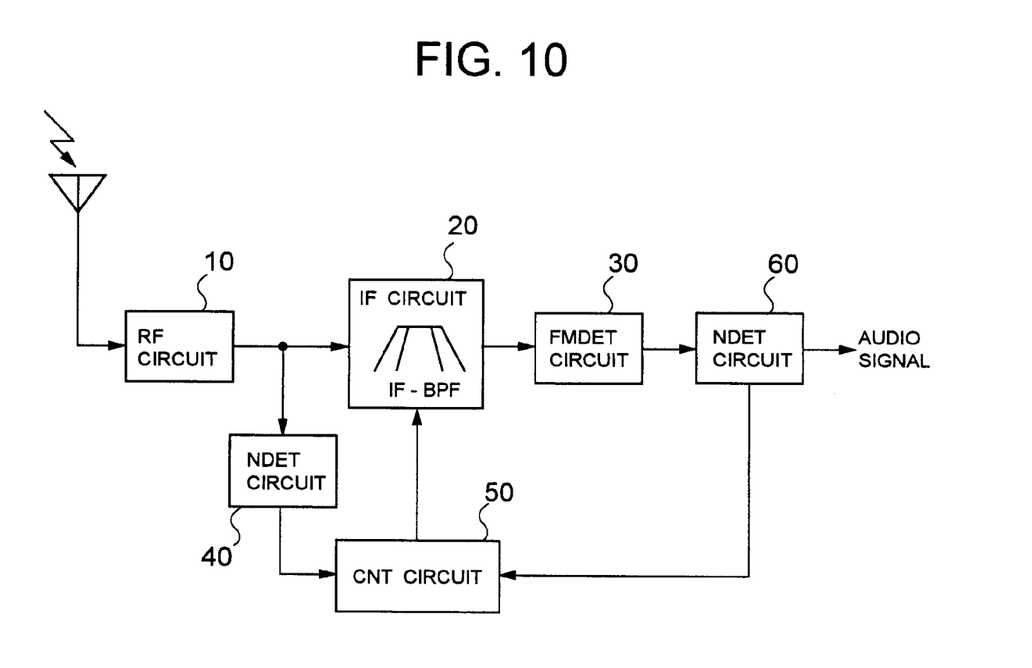
FIG. 10 is a block diagram showing the configuration of a receiver having the function of eliminating an adjacent interfering wave based on another embodiment of the present invention.

A receiver having the function of eliminating an adjacent interfering wave as shown in FIG. 10 will be described as a modification of the above embodiments.

In the configuration of the receiver shown in FIG. 9, as in the conventional example shown in FIG. 1, a high-frequency noise detection circuit 60 is further provided at the stage following the detection circuit 30, and detects high-frequency noise components contained in the detected output. That is to say, the control circuit 50 combines adjacent interfering wave detection information from the above-described adjacent interfering wave detection circuit 40 and high-frequency noise detection information from the high-frequency noise detection circuit 60, and controls the passband of the IF-BPF of the intermediate-frequency processing circuit 20.

As a specific example of a control method using those two kinds of detection information, for example, when the passband of the IF-BPF is subjected to band-narrowing based on the detection information from the adjacent interfering wave detection circuit 40, a predetermined weight may be added to the bandwidth on which band-narrowing is performed, in accordance with the detection information from the high-frequency noise detection circuit 60. Also, a band-narrowing control of the pass bandwidth of the IF-BPF may be performed by simply adopting AND (logical multiplication) output or OR (logical addition) output of both detection results.

As described above in detail, the receiver according to the present invention is a receiver with adjacent interfering wave elimination function for detecting and eliminating an adjacent interfering wave that is adjacent to a receiving signal frequency, and includes:

a high-frequency processing device that selects a desired high-frequency signal from received high-frequency signals and amplifies it;

an intermediate-frequency processing device that converts a frequency of the selected high-frequency signal to generate an intermediate-frequency signal, and outputs components within a predetermined passband of the intermediate-frequency signal;

an adjacent interfering wave detector that detects an interfering wave contained in a region adjacent to a frequency band of the selected high-frequency signal and generates an adjacent interfering wave detection signal indicating a frequency range in which the interfering wave exists; and a control device for adjusting the passband so as to eliminate the frequency range in which the adjacent interfering wave exists from the passband based on the adjacent interfering wave detection signal.

This receiver allows to monitor adjacent interfering waves near the desired reception wave in detail, so that band-narrowing of the intermediate-frequency bandpass filter can be performed so as to minimize the effect of adjacent interfering waves and to minimize signal distortion after detection.

In addition, in another embodiment of the present invention, an interfering signal elimination apparatus includes:

a first extractor for extracting a signal within a first frequency range and obtaining a receiving signal contained in the extracted signal;

a second extractor for extracting a signal within a second frequency range;

a detector for detecting that an interfering signal is contained in the signal extracted by the second extractor;

a first modification device for modifying the first frequency range; and a second modification device for modifying a frequency of a signal that is extracted by the second extractor;

wherein, when the detector detects the interfering signal, the first modification device modifies the first frequency range so that the interfering signal is eliminated from the first frequency range.

In this interfering signal elimination apparatus, the passband of the receiving signal can be set while avoiding an interfering signal, so that a high-quality receiving signal can be demodulated and reproduced.

This application is based on Japanese Patent Application No. 2002-193222 which is herein incorporated by reference.

What is claimed is:

1. A receiver with adjacent interfering wave elimination function for detecting and eliminating an adjacent interfering wave that is adjacent to a receiving signal frequency, comprising:

a high-frequency processing device that selects a desired high-frequency signal from received high-frequency signals and amplifies it;

an intermediate-frequency processing device that converts a frequency of the selected high-frequency signal to generate an intermediate-frequency signal, and outputs components within a predetermined passband of the intermediate-frequency signal;

an adjacent interfering wave detector that detects an interfering wave contained in a region adjacent to a frequency band of the selected high-frequency signal and generates an adjacent interfering wave detection signal indicating a frequency range in which the interfering wave exists; and a control device for adjusting the passband so as to eliminate the frequency range in which the adjacent interfering wave exists from the passband based on the adjacent interfering wave detection signal.

2. The receiver with adjacent interfering wave elimination function according to claim 1, wherein the adjacent interfering wave detector comprises:

at least one low frequency side bandpass filter whose passband center frequency is in a lower frequency region adjacent to a frequency band of the high-frequency signal;

at least one high frequency side bandpass filter whose passband center frequency is in an adjacent higher frequency region; and a detection circuit that detects the interfering wave based on outputs from the low frequency side bandpass filter and the high frequency side bandpass filter.

3. The receiver with adjacent interfering wave elimination function according to claim 2, further comprising a noise detection device that detects a noise signal component contained in a detection output signal that is obtained by detecting the intermediate-frequency signal and generates a noise detection signal, wherein the control device adjusts a bandwidth of the intermediate-frequency processing device so as to eliminate a frequency range in which the adjacent interfering wave exists from the passband of the intermediate-frequency processing device, based on the adjacent interfering wave detection signal and the noise detection signal.

4. The receiver with adjacent interfering wave elimination function according to claim 1, wherein the adjacent interfering wave detector comprises:

a variable bandpass filter whose center frequency is variable within a region adjacent to a frequency band of the high-frequency signal; and a detection circuit that detects the interfering wave based on the output of the variable bandpass filter.

5. The receiver with adjacent interfering wave elimination function according to claim 4, wherein the variable bandpass filter is an IIR digital bandpass filter, and when changing the center frequency, only one coefficient term of the transfer function is adjusted to vary the center frequency of the passband.

6. The receiver with adjacent interfering wave elimination function according to claim 5, further comprising a noise detection device that detects a noise signal component contained in a detection output signal that is obtained by detecting the intermediate-frequency signal and generates a noise detection signal, wherein the control device adjusts a bandwidth of the intermediate-frequency processing device so as to eliminate a frequency range in which the adjacent interfering wave exists from the passband of the intermediate-frequency processing device, based on the adjacent interfering wave detection signal and the noise detection signal.

7. The receiver with adjacent interfering wave elimination function according to claim 4, further comprising a noise detection device that detects a noise signal component contained in a detection output signal that is obtained by detecting the intermediate-frequency signal and generates a noise detection signal, wherein the control device adjusts a bandwidth of the intermediate-frequency processing device so as to eliminate a frequency range in which the adjacent interfering wave exists from the passband of the intermediate-frequency processing device, based on the adjacent interfering wave detection signal and the noise detection signal.

8. The receiver with adjacent interfering wave elimination function according to claim 1, further comprising a noise detection device that detects a noise signal component contained in a detection output signal that is obtained by detecting the intermediate-frequency signal and generates a noise detection signal, wherein the control device adjusts a bandwidth of the intermediate-frequency processing device so as to eliminate a frequency range in which the adjacent interfering wave exists from the passband of the intermediate-frequency processing device, based on the adjacent interfering wave detection signal and the noise detection signal.

9. An interfering signal elimination apparatus, comprising:

a first extractor that extracts a signal within a first frequency range and obtains a receiving signal contained in the extracted signal;

a second extractor that extracts a signal within a second frequency range;

a detector that detects that an interfering signal is contained in the signal extracted by the second extractor;

a first modification device that modifies the first frequency range; and a second modification device that modifies a frequency of a signal that is extracted by the second extractor;

wherein, when the detector detects the interfering signal, the first modification device modifies the first frequency range so that the interfering signal is eliminated from the first frequency range.

10. The interfering signal elimination device according to claim 9, further comprising:

a recognition device that recognizes a frequency of the interfering signal when the detector detects the interfering signal; and a sensor that senses that the frequency of the interfering signal recognized by the recognition device is contained within the first frequency range;

wherein, when the sensor has sensed that the frequency of the interfering signal is contained within the first frequency range, the first modification device modifies the first frequency range so that the interfering signal is eliminated from the first frequency range.

11. The interfering signal elimination apparatus according to claim 10, wherein the first extractor and the second extractor are bandpass filters whose passband center frequency can be freely adjusted.

12. The interfering signal elimination apparatus according to claim 10, wherein the second extractor is a bandpass filter whose passband center frequency is modified in predetermined frequency steps.

13. The interfering signal elimination apparatus according to claim 10, wherein, when the first modification device modifies the first frequency range so that the interfering signal is eliminated from the first frequency range, it narrows the first frequency range.

14. The interfering signal elimination apparatus according claim 10, wherein, when the first modification device modifies the first frequency range so that the interfering signal is eliminated from the first frequency range, it modifies the center frequency of the first frequency range.

15. The interfering signal elimination device according to claim 9, further comprising a decision device for deciding an overlap of frequencies within the first frequency range and frequencies within the second frequency range, wherein, when the detector detects an interfering signal and when the decision device decides that the frequencies within the first frequency range overlap with the frequencies within the second frequency range, then the first modification device modifies the first frequency range so that the second frequency range is eliminated from the first frequency range.

16. The interfering signal elimination apparatus according to claim 15, wherein the first extractor and the second extractor are bandpass filters whose passband center frequency can be freely adjusted.

17. The interfering signal elimination apparatus according to claim 15, wherein the second extractor is a bandpass filter whose passband center frequency is modified in predetermined frequency steps.

18. The interfering signal elimination apparatus according to claim 15, wherein, when the first modification device modifies the first frequency range so that the interfering signal is eliminated from the first frequency range, it narrows the first frequency range.

19. The interfering signal elimination apparatus according claim 15, wherein, when the first modification device modifies the first frequency range so that the interfering signal is eliminated from the first frequency range, it modifies the center frequency of the first frequency range.

20. The interfering signal elimination apparatus according to claim 9, wherein the first extractor and the second extractor are bandpass filters whose passband center frequency can be freely adjusted.

21. The interfering signal elimination apparatus according to claim 9, wherein the second extractor is a bandpass filter whose passband center frequency is modified in predetermined frequency steps.

22. The interfering signal elimination apparatus according to claim 9, wherein, when the first modification device modifies the first frequency range so that the interfering signal is eliminated from the first frequency range, it narrows the first frequency range.

23. The interfering signal elimination apparatus according claim 9, wherein, when the first modification device modifies the first frequency range so that the interfering signal is eliminated from the first frequency range, it modifies the center frequency of the first frequency range.

* * * * *